US012580140B2

(12) United States Patent
Wang

(10) Patent No.: US 12,580,140 B2
(45) Date of Patent: Mar. 17, 2026

(54) KEY STRUCTURE FOR KEYBOARD

(71) Applicant: Voyetra Turtle Beach, Inc., San Diego, CA (US)

(72) Inventor: Wei Chuan Wang, New Taipei (TW)

(73) Assignee: Voyetra Turtle Beach, Inc., San Diego, CA (US)

( * ) Notice: Subject to any disclaimer, the term of this patent is extended or adjusted under 35 U.S.C. 154(b) by 226 days.

(21) Appl. No.: 18/559,606

(22) PCT Filed: May 4, 2022

(86) PCT No.: PCT/US2022/027599
§ 371 (c)(1),
(2) Date: Nov. 8, 2023

(87) PCT Pub. No.: WO2022/240627
PCT Pub. Date: Nov. 17, 2022

(65) Prior Publication Data

US 2024/0234053 A1 Jul. 11, 2024

(30) Foreign Application Priority Data

May 10, 2021 (TW) ................................ 110205251
May 14, 2021 (CN) ......................... 202121030835.3

(51) Int. Cl.
*H01H 13/7065* (2006.01)

(52) U.S. Cl.
CPC ............................... *H01H 13/7065* (2013.01)

(58) Field of Classification Search
CPC ........ H01H 3/83; H01H 3/125; H01H 13/705; H01H 13/14; H01H 13/04; H01H 13/10;
(Continued)

(56) References Cited

U.S. PATENT DOCUMENTS 4,755,645 A * 7/1988 Naoki .................... H01H 13/20
200/290
10,008,346 B1 * 6/2018 Chang .................... H01H 13/06
(Continued)

FOREIGN PATENT DOCUMENTS

CN 203367103 U 12/2013
CN 107706026 A 2/2018
(Continued)

*Primary Examiner* — Ahmed M Saeed
(74) *Attorney, Agent, or Firm* — Sheppard Mullin Richter & Hampton LLP

(57) ABSTRACT

A key structure may include a lower shell inserted into an insertion opening, where an annular stopper protrudes from the lower shell, which may include transparent grooves arranged on opposite inner sides of the annular stopper, the annular stopper may be formed with elastic arms on outer sides of the grooves, clamping hooks engaged with the top plate extend downwardly from the elastic arms, the annular stopper, and the annular stopper and a top plate stop and locate each other. The key structure may include an upper shell above the lower shell, that may include a through opening. The key structure may include a pressing shaft movably disposed between the lower shell and the upper shell, where a top end of the pressing shaft penetrates the through insertion opening. Moreover, the key structure may include a spring disposed and elastically supported between the lower shell and the pressing shaft.

10 Claims, 8 Drawing Sheets

(58) Field of Classification Search
CPC .. H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20
See application file for complete search history.

(56) References Cited

U.S. PATENT DOCUMENTS

| | | | | |
|---|---|---|---|---|
| 10,325,734 | B1 * | 6/2019 | Iijima | H01H 13/14 |
| 2017/0169967 | A1 * | 6/2017 | Chen | H03K 17/968 |
| 2018/0166231 | A1 | 6/2018 | Wu | |
| 2019/0066947 | A1 * | 2/2019 | Chiu | H01H 13/14 |
| 2019/0172661 | A1 | 6/2019 | Hsieh | |
| 2020/0043680 | A1 | 2/2020 | Ruff | |

FOREIGN PATENT DOCUMENTS

| | | | |
|---|---|---|---|
| CN | 207637666 | U | 7/2018 |
| CN | 209118970 | U | 7/2019 |
| TW | M609309 | U | 3/2021 |

* cited by examiner

KEY STRUCTURE FOR KEYBOARD

CROSS-REFERENCE TO RELATED APPLICATIONS

This application is a National Phase application under 35 U.S.C. § 371 of PCT Application No. PCT/US2022/027599, filed May 4, 2022, which application claims the benefit of Chinese Patent Application No. 202121030835.3, filed May 14, 2021 (which issued as Chinese Patent No. ZL 202121030835.3 on Jan. 11, 2022), and Taiwan Patent Application No. 110205251, filed May 10, 2021 (which issued as Taiwan Patent No. M618907 on Nov. 1, 2021), which are hereby incorporated herein by reference in their entirety.

TECHNICAL FIELD

The present invention relates to a key structure, and in particular to a key structure for a keyboard.

BACKGROUND OF THE INVENTION

As e-sports games become more popular and widespread, players' requirements for video game equipment specifications have also increased, leading to the emergence of a mechanical keyboard on the market. This mechanical keyboard has mechanical keys with long pressing strokes, precise touch and pressing feel, and long service life.

A traditional mechanical key comprises an upper shell, a lower shell, a pressing shaft, a spring, and a cap. The upper shell and the lower shell are assembled with each other and a cavity is formed inside them. The pressing shaft and the spring are accommodated in the cavity. A top end of the pressing shaft is exposed on the upper shell, the spring is elastically supported between a bottom end of the pressing shaft and the lower shell, and the cap is installed on the top end of the pressing shaft.

However, when the above lower shell is installed on the keyboard, a stopper that is latched with the keyboard to position and is exposed on the keyboard protrudes from an outer peripheral edge of the lower shell, and in order to allow the lower shell to be firmly assembled on the keyboard, an outer peripheral wall of the stopper will be formed with protrusions and grooves so as to be matched with the structure of the keyboard or the upper shell. However, the unevenness of the outer peripheral wall of the stopper will cause the appearance of the keys to be unsightly, thereby making it difficult to attract consumers to buy.

BRIEF SUMMARY OF THE INVENTION

Embodiments of the present invention provide a key structure for a keyboard, which uses an annular stopper whose outer peripheral wall is not provided with a concave-convex structure, so that the annular stopper presents the form of an annular outer peripheral wall, thereby improving the appearance and aesthetics of the key structure.

One embodiment of the present invention provides a key structure for a keyboard, the keyboard having a top plate, and the top plate being provided with an insertion opening, wherein the key structure comprises: a lower shell inserted into the insertion opening, wherein an annular stopper protrudes from the outside of the lower shell and the lower shell is provided with two transparent grooves arranged on two opposite inner sides of the annular stopper, the annular stopper is formed with two elastic arms on outer sides of the two transparent grooves, two clamping hooks engaged with the top plate extend downwardly from the bottom of the two elastic arms, the annular stopper is exposed on the top plate, and the annular stopper and the top plate stop and locate each other; an upper shell assembled above the lower shell, wherein the upper shell is provided with a through opening; a pressing shaft movably sandwiched between the lower shell and the upper shell, wherein a top end of the pressing shaft penetrates the through opening; and a spring sandwiched and elastically supported between the lower shell and the pressing shaft.

In some embodiments, the lower shell has a bottom wall and an annular peripheral wall surrounding a peripheral edge of the bottom wall, and the annular stopper is molded by extending outwardly from the top of an outer peripheral edge of the annular peripheral wall.

In some embodiments, the two transparent grooves are provided on two opposite side walls of the annular peripheral wall.

In some embodiments, the annular stopper and the annular peripheral wall each have a square shape, the annular stopper has a pair of first opposite sides and a pair of second opposite sides, and the two clamping hooks are formed at the bottom of the pair of first opposite sides.

In some embodiments, the second opposite sides are provided with two clamping slots, two clamping blocks provided inside the clamping slots extend from the annular stopper, two undercut hooks extend from the upper shell, and the undercut hooks are engaged with the clamping slots and are mutually latched with the clamping blocks.

In some embodiments, a ring protrusion extends from an outer peripheral edge of the upper shell, and the two undercut hooks are molded by extending downwardly from two sides of the bottom of the ring protrusion.

In some embodiments, an outer peripheral edge of the ring protrusion is inwardly provided with two notches located above the two undercut hooks, two protrusions protruding from the top of the annular stopper extend upwardly from the two clamping blocks, and the protrusions are embedded into the notches, so that the ring protrusion and the two protrusions together form an annular outer peripheral wall.

In some embodiments, a protruding column extends upwardly from the bottom wall, and the spring is a coil spring and is sleeved on the protruding column.

In some embodiments, the upper shell is made of a transparent plastic material, two light guide columns extend from the upper shell, and the light guide columns are accommodated in the transparent grooves and can be slidably moved therein.

In some embodiments, the key structure further comprises a cap, and the cap is assembled on the top of the pressing shaft and rises or falls following the pressing shaft.

In some embodiments, the outer peripheral wall of the annular stopper does not need to be provided with a concave-convex structure, so that the lower shell can be firmly assembled on the top plate. Therefore, compared with the outer peripheral wall of the stopper of the known lower shell presenting unevenness, the outer peripheral wall of the annular stopper of the present is not provided with a concave-convex structure, so that the annular stopper presents the form of an annular outer peripheral wall, thereby improving the appearance and aesthetics of the key structure.

Figure 1:
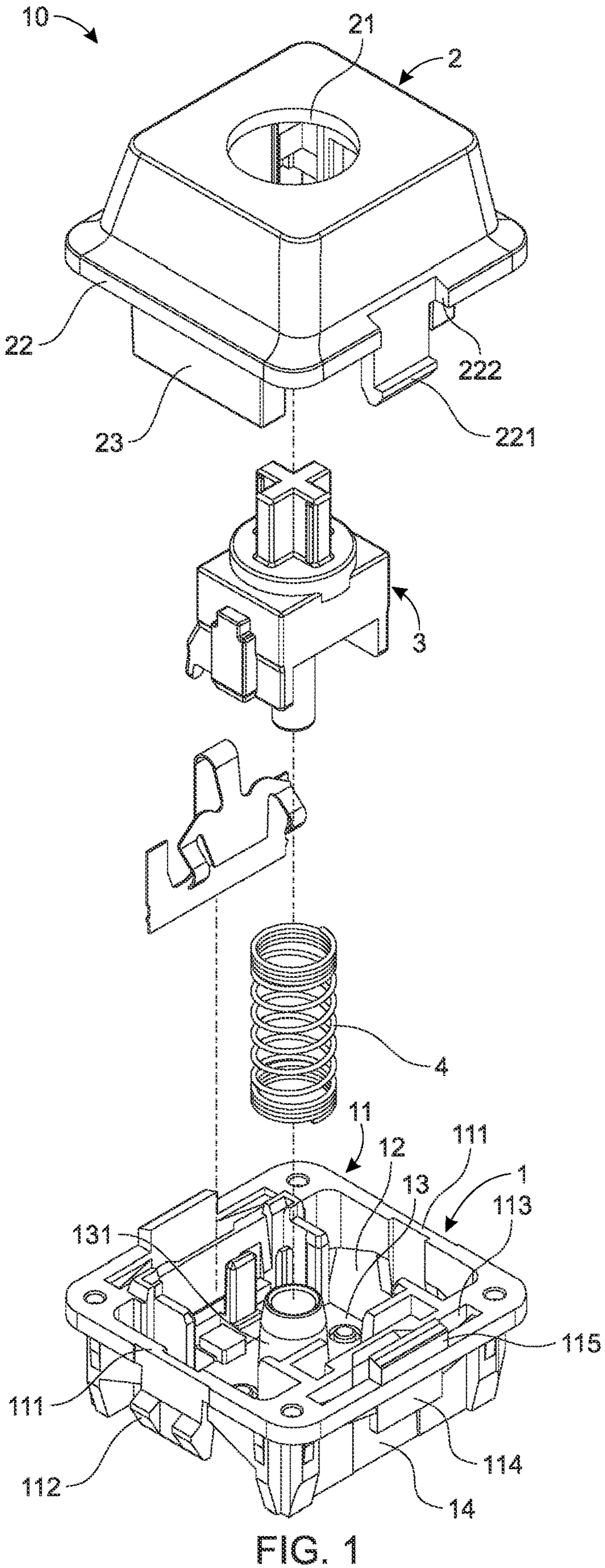
FIG. 1 is a perspective exploded view of a key structure.
Figure 2:
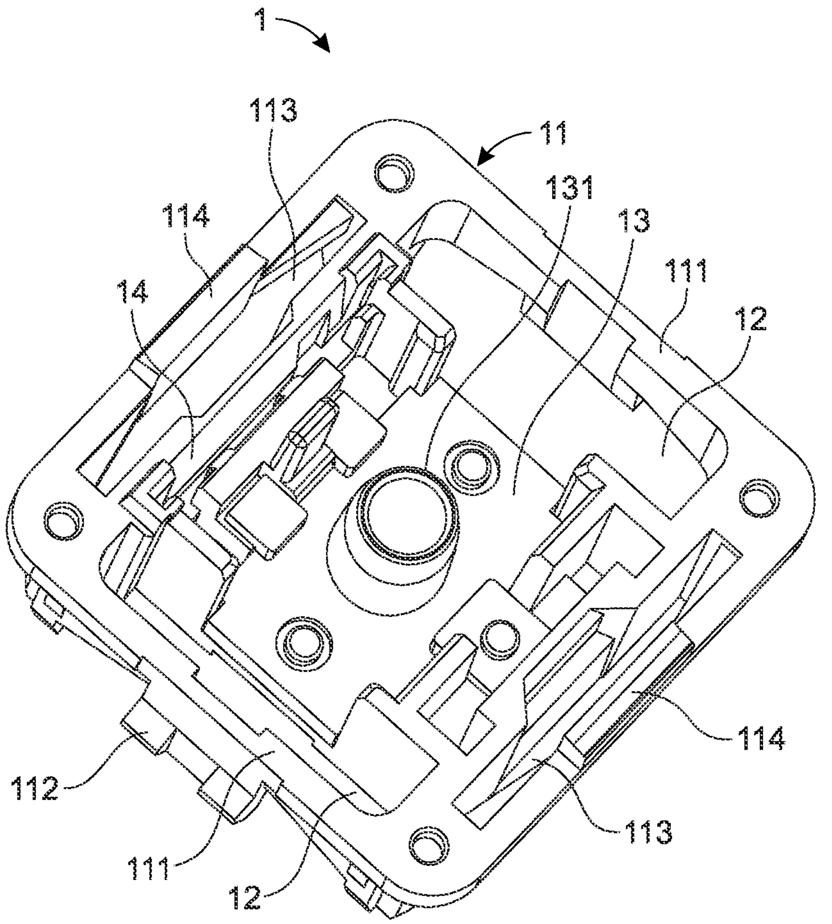
FIG. 2 is a perspective schematic view of a lower shell.
Figure 3:
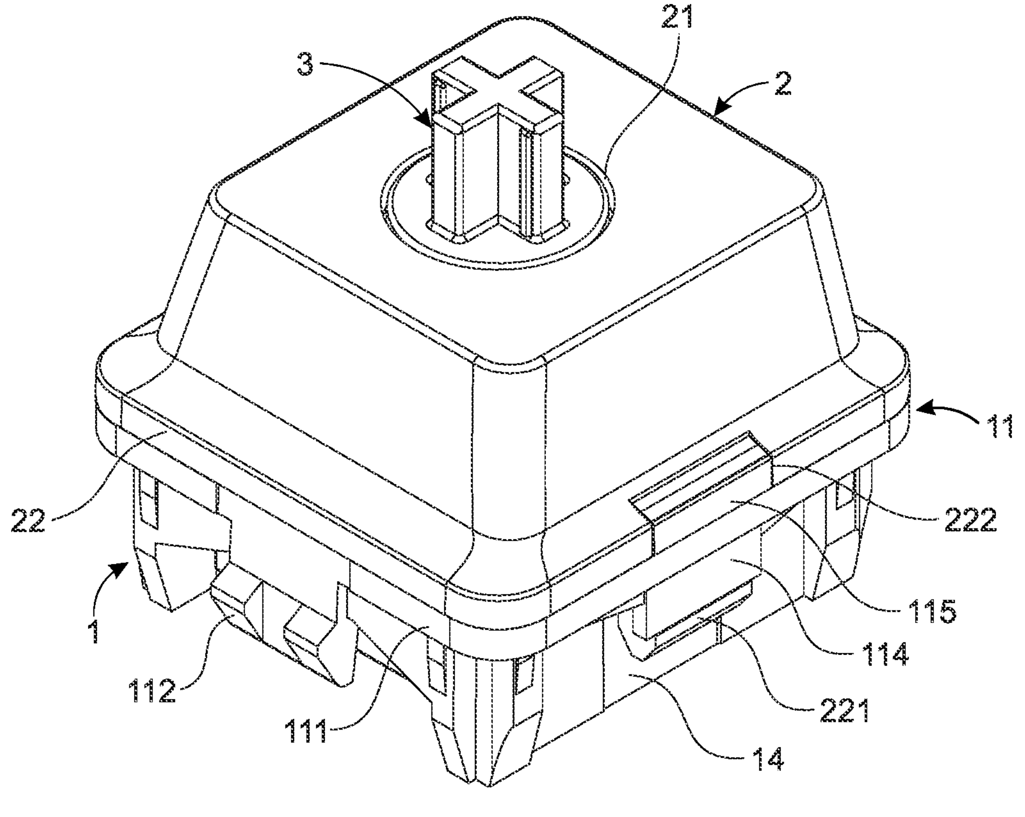
FIG. 3 is a perspective assembly view of the key structure.
Figure 4:
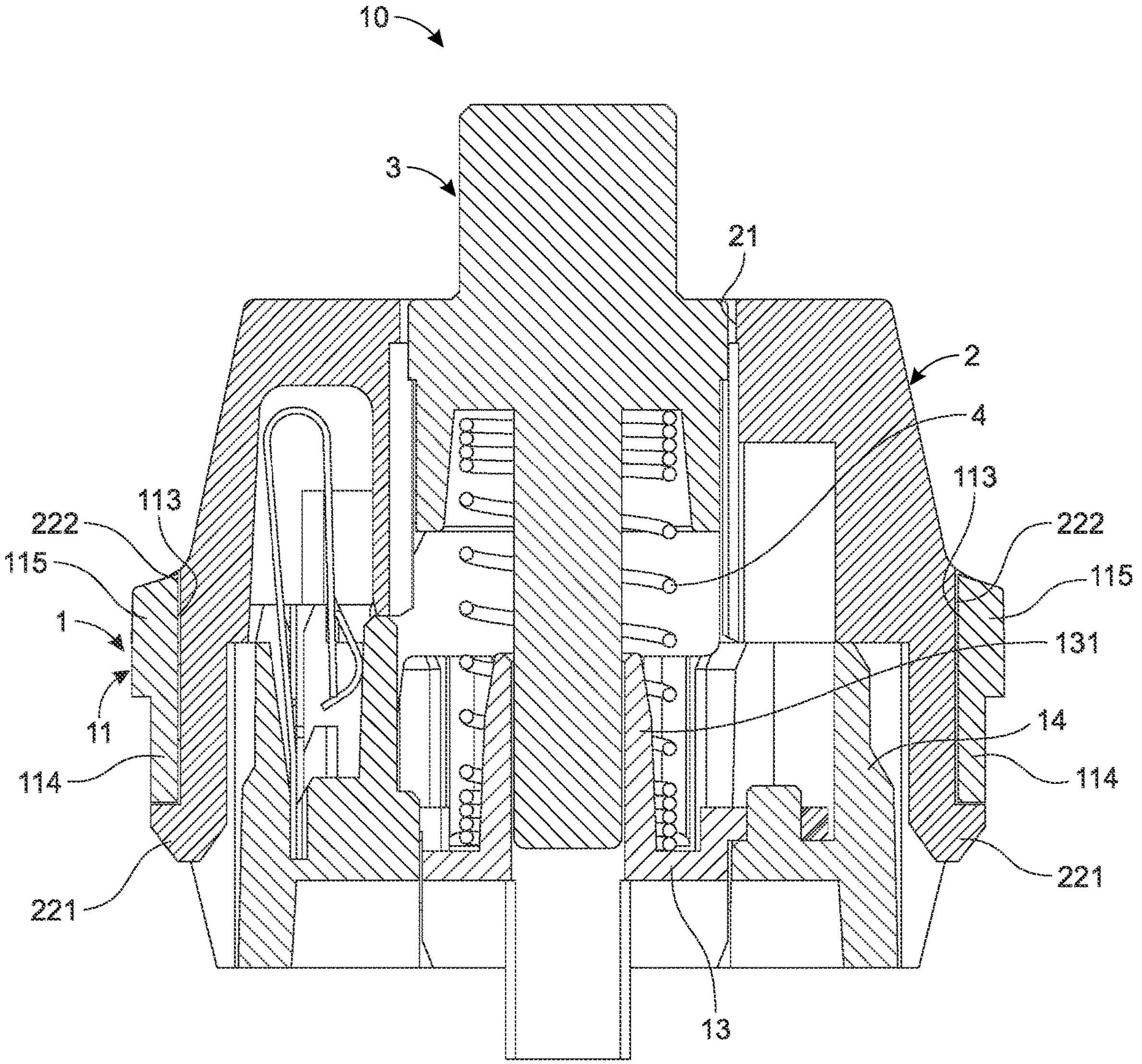
FIG. 4 is a cross-sectional assembly view of the key structure.

10: key structure; 1: lower shell; 11: annular stopper; 111: elastic arm; 112: clamping hook; 113: clamping slot; 114: clamping block; 115: protrusion; 12: transparent groove; 13: bottom wall; 131: protruding column; 14: annular peripheral wall; 2: upper shell; 21: through opening; 22: ring protrusion; 221: undercut hook; 222: notch; 23: light guide column; 3: pressing shaft; 4: spring; 5: cap; 100: keyboard; 101: top plate; 102: insertion opening.

DETAILED DESCRIPTION

The detailed description and technical content of embodiments of the present invention will be described below in conjunction with the accompanying drawings. However, the accompanying drawings are only for illustrative purposes and are not used to limit the present invention.

Referring to FIGS. 1 to 8, embodiments provide a key structure for a keyboard. This key structure 10 mainly comprises a lower shell 1, an upper shell 2, a pressing shaft 3, and a spring 4.

Figure 5:
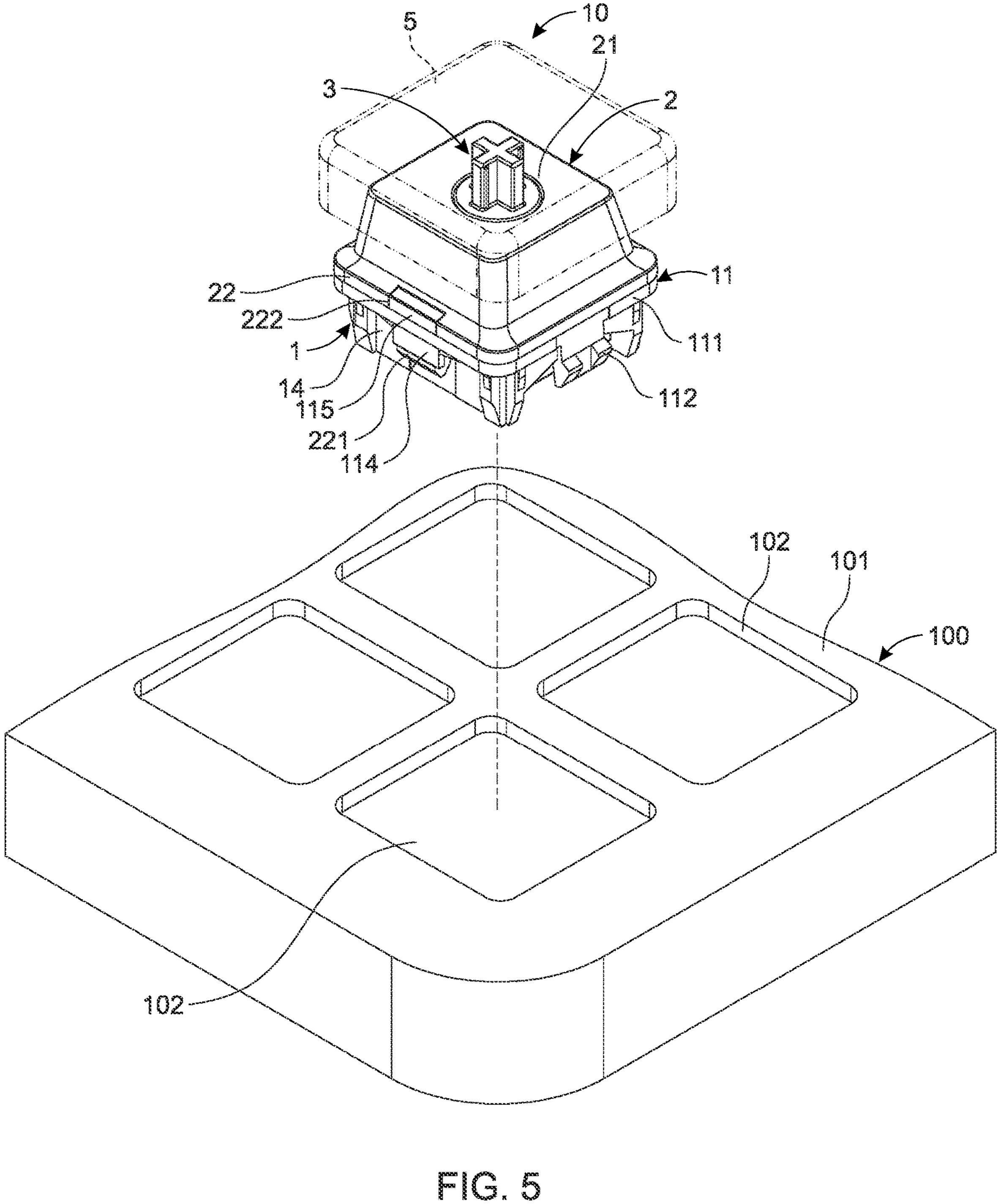
FIG. 5 is a perspective view of the key structure in a use state.
Figure 6:
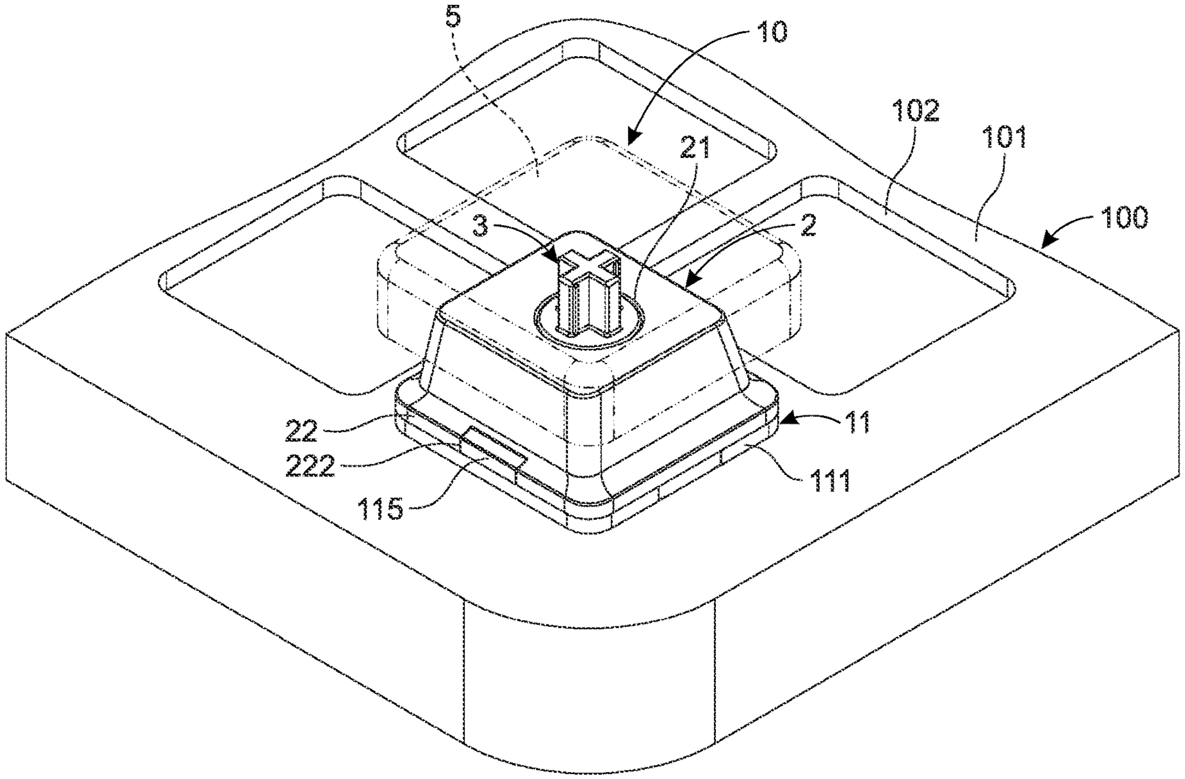
FIG. 6 is a perspective view of the key structure in another use state.
Figure 7:
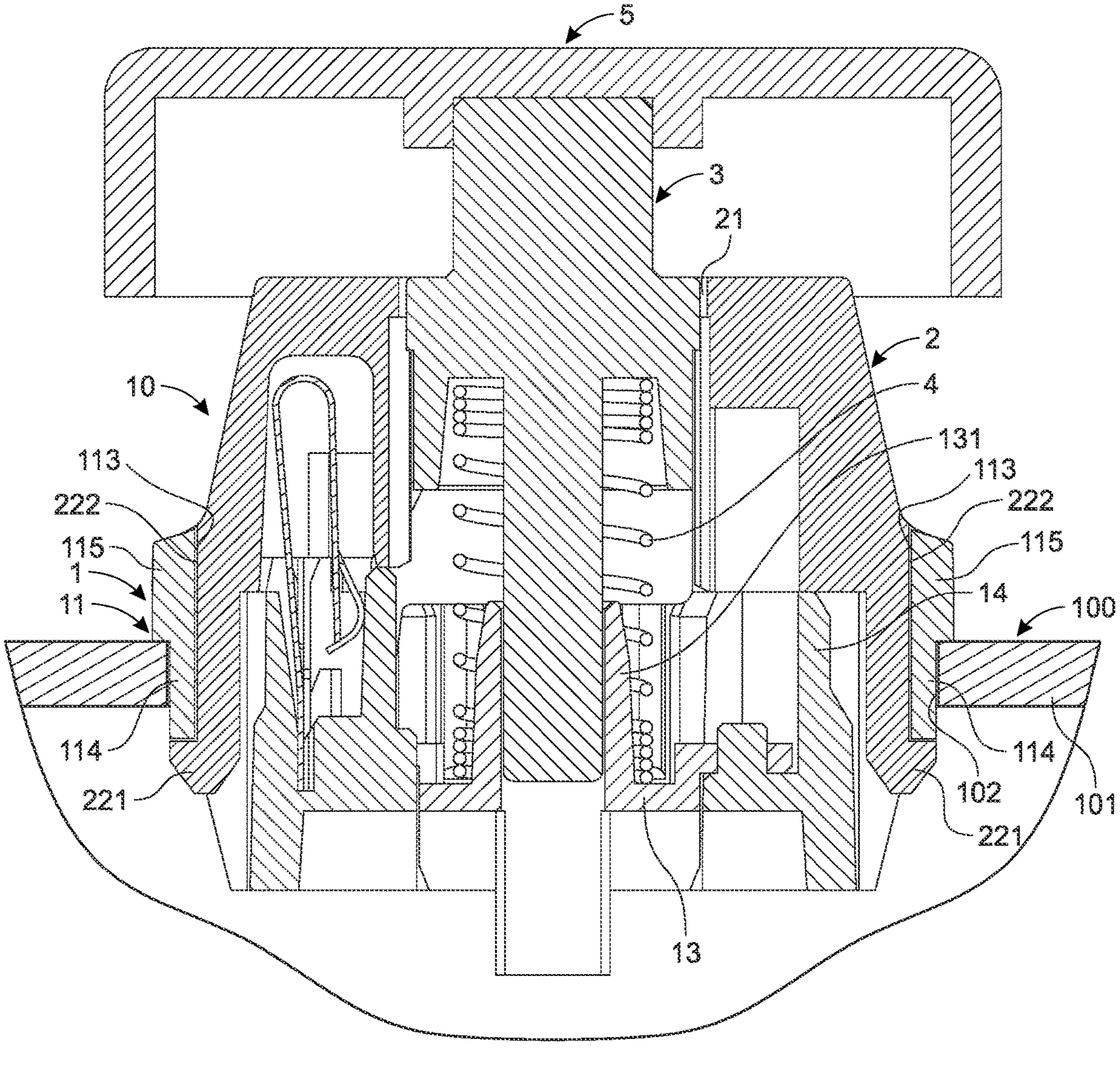
FIG. 7 is a cross-sectional view of the key structure in a use state.
Figure 8:
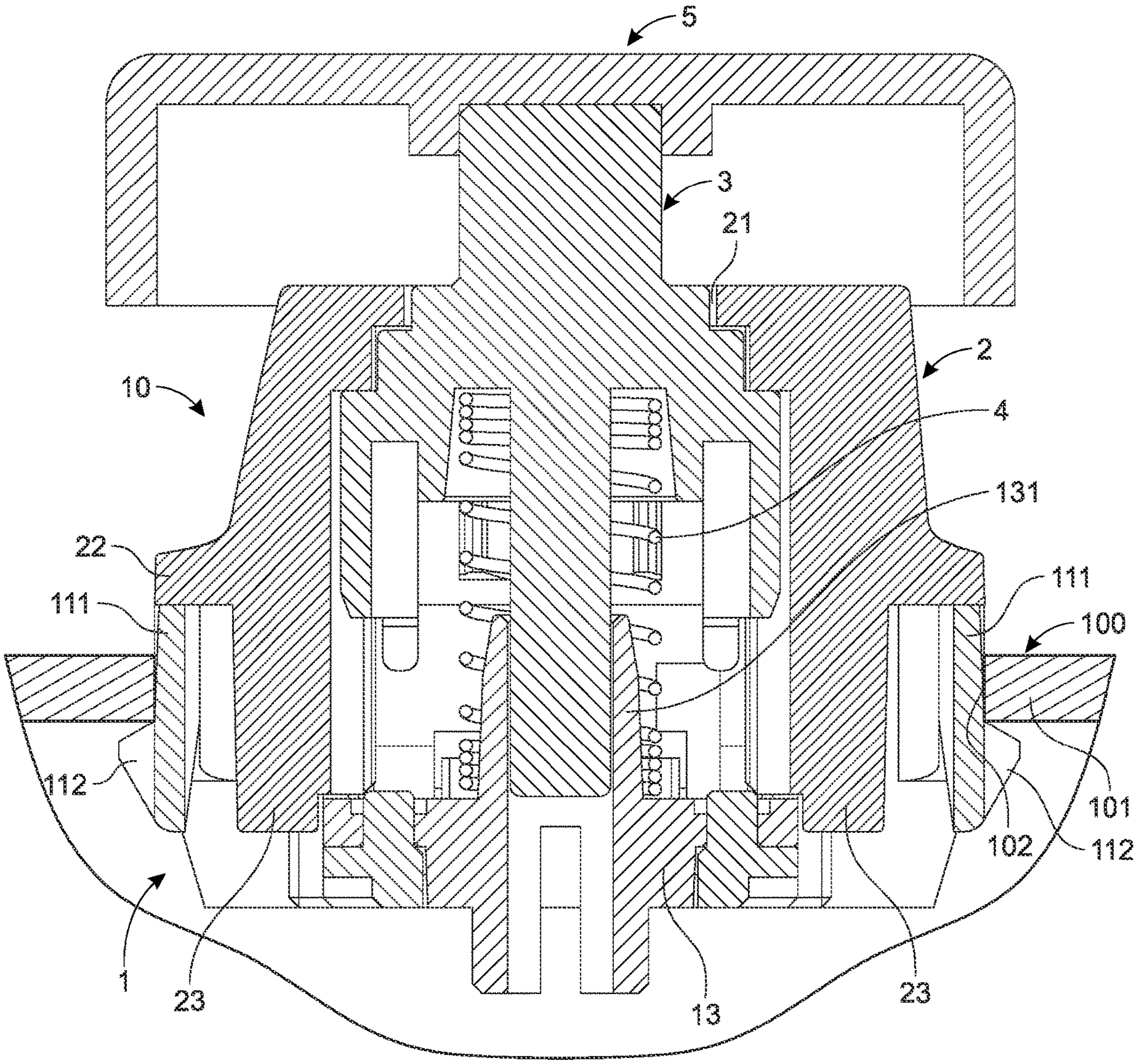
FIG. 8 is a cross-sectional view of the key structure in another use state.

As shown in FIGS. 5 to 6, the key structure 10 of the present invention may be used for a keyboard base 100. The keyboard 100 has a top plate 101, and the top plate 101 is provided with one or more insertion openings 102.

As shown in FIGS. 1 to 8, the lower shell 1 is inserted into the insertion opening 102. An annular stopper 11 protrudes from the outside of the lower shell 1, and the lower shell 1 is further provided with two transparent grooves 12 arranged on two opposite inner sides of the annular stopper 11. The annular stopper 11 is formed with two elastic arms 111 on outer sides of the two transparent grooves 12. Two clamping hooks 112 engaged with the top plate 101 extend downwardly from the bottom of the two elastic arms 111. The annular stopper 11 is exposed on the top plate 101, and the annular stopper 11 and the top plate 101 stop and locate each other.

The lower shell 1 has a bottom wall 13 and an annular peripheral wall 14 surrounding a peripheral edge of the bottom wall 13. The annular stopper 11 is molded by extending outwardly from the top of an outer peripheral edge of the annular peripheral wall 14. Two transparent grooves 12 are provided on two opposite side walls of the annular peripheral wall 14. A protruding column 131 extends upwardly from the bottom wall 13.

In addition, the annular stopper 11 and the annular peripheral wall 14 each have a square shape. The annular stopper 11 has a pair of first opposite sides and a pair of second opposite sides. The two clamping hooks 112 are formed at the bottom of this pair of first opposite sides. The second opposite sides are provided with two clamping slots 113. Two clamping blocks 114 provided inside the clamping slots 113 extend from the annular stopper 11, and two protrusions 115 protruding from the top of the annular stopper 11 extend upwardly from the two clamping blocks 114.

As shown in FIGS. 1 and 3 to 8, the upper shell 2 is assembled above the lower shell 1. The upper shell 2 is provided with a through opening 21, and two undercut hooks 221 extend from the upper shell 2. The undercut hooks 221 are engaged with the clamping slots 113, and are mutually latched with the clamping blocks 114.

A ring protrusion 22 extends from an outer peripheral edge of the upper shell 2. The two undercut hooks 221 are molded by extending downwardly from two sides of the bottom of the ring protrusion 22, and two notches 222 located above the two undercut hooks 221 are inwardly provided on an outer peripheral edge of the ring protrusions 22. The protrusions 115 are embedded into the notches 222, so that the ring protrusion 22 and the two protrusions 115 together form an annular outer peripheral wall.

In addition, the upper shell 2 is made of a transparent plastic material. Two light guide columns 23 extend from the upper shell 2. The light guide columns 23 are accommodated in the transparent grooves 12 and can be slidably moved therein. The light guide columns 23 are arranged to be opposite to a light-emitting source (not shown in the figures) installed on the keyboard 100, so as to guide the light from the light-emitting source to the upper shell 2.

As shown in FIGS. 1 and 3 to 8, the pressing shaft 3 is movably sandwiched between the lower shell 1 and the upper shell 2, and a top end of the pressing shaft 3 penetrates the through opening 21.

As shown in FIGS. 1, 4 and 7 to 8, the spring 4 is sandwiched and elastically supported between the lower shell 1 and the pressing shaft 3. The spring 4 of this embodiment is a coil spring and is sleeved on the protruding column 131, but it is not limited thereto.

As shown in FIGS. 5 to 8, the key structure 10 of the present invention further comprises a cap 5. The cap 5 is assembled on the top of the pressing shaft 3, and the cap 5 follows the pressing shaft 3 to rise or fall.

As shown in FIGS. 5 to 8, in the use states of the key structure 10 of this embodiment, the lower shell 1 is provided with the two transparent grooves 12 that are arranged on two opposite inner sides of the annular stopper 11, and the two clamping hooks 112 engaged with the top plate 101 extend from the two elastic arms 111. As a result, the outer peripheral wall of the annular stopper 11 does not need to be provided with a concave-convex structure, so that the lower shell 1 can be firmly assembled on the top plate 101. Therefore, compared with the outer peripheral wall of the stopper of the known lower shell presenting unevenness, the outer peripheral wall of the annular stopper 11 is not provided with a concave-convex structure, so that the annular stopper 11 presents the form of an annular outer peripheral wall, thereby improving the appearance and aesthetics of the key structure 10.

Further, two protrusions 115 extend from the annular stopper 11, and two notches 222 located above the two undercut hooks 221 are inwardly provided on an outer peripheral edge of the ring protrusion 22. The protrusions 115 are engaged with the notches 222, so that the ring protrusion 22 and the two protrusions 115 together present the form of an annular outer peripheral wall, thereby enhancing the appearance and aesthetics of the key structure 10.

In summary, the key structure for the keyboard can indeed achieve the intended purpose of use and solves the defects of the prior art, and has industrial applicability. Moreover, the embodiments described above are only preferred embodiments for sufficiently explaining the disclosed embodiments, and the scope of protection is not limited thereto. The equivalent substitutions or transformations made by a person skilled in the art on the basis of the present disclosure are all within the scope of protection of the present invention.

The invention claimed is:

1. A key structure for a keyboard, the keyboard having a top plate, and the top plate being provided with an insertion opening, the key structure comprising:

a lower shell inserted into the insertion opening, wherein an annular stopper protrudes from of the lower shell and the lower shell comprises two transparent grooves arranged on two opposite inner sides of the annular stopper, the annular stopper is formed with two elastic arms on outer sides of the two transparent grooves, two clamping hooks engaged with the top plate extend downwardly from the two elastic arms, the annular stopper is exposed on the top plate, and the annular stopper and the top plate stop and locate each other;

an upper shell assembled above the lower shell, wherein the upper shell comprises a through opening;

a pressing shaft movably disposed between the lower shell and the upper shell, wherein a top end of the pressing shaft penetrates the insertion opening; and a spring disposed and elastically supported between the lower shell and the pressing shaft.

2. The key structure for the keyboard according to claim 1, wherein the lower shell comprises a bottom wall and an annular peripheral wall surrounding a peripheral edge of the bottom wall, and the annular stopper is extends outwardly from the top of an outer peripheral edge of the annular peripheral wall.

3. The key structure for the keyboard according to claim 2, wherein the two transparent grooves are provided on two opposite side walls of the annular peripheral wall.

4. The key structure for the keyboard according to claim 2, wherein the annular stopper and the annular peripheral wall each have a square shape, the annular stopper comprises a pair of first opposite sides and a pair of second opposite sides, and the two clamping hooks are formed at the bottom of the pair of first opposite sides.

5. The key structure for the keyboard according to claim 4, wherein the second opposite sides are provided with two clamping slots, two clamping blocks provided inside the clamping slots extend from the annular stopper, two undercut hooks extend from the upper shell, and the undercut hooks are engaged with the clamping slots and are mutually latched with the clamping blocks.

6. The key structure for the keyboard according to claim 5, wherein a ring protrusion extends from an outer peripheral edge of the upper shell, and the two undercut hooks are molded by extending downwardly from two sides of the bottom of the ring protrusion.

7. The key structure for the keyboard according to claim 6, wherein an outer peripheral edge of the ring protrusion is inwardly provided with two notches located above the two undercut hooks, two protrusions protruding from the top of the annular stopper extend upwardly from the two clamping blocks, and the protrusions are embedded into the notches, so that the ring protrusion and the two protrusions together form an annular outer peripheral wall.

8. The key structure for the keyboard according to claim 2, wherein a protruding column extends upwardly from the bottom wall, and the spring comprises a coil spring sleeved on the protruding column.

9. The key structure for the keyboard according to claim 1, wherein the upper shell comprises a transparent plastic material, two light guide columns extend from the upper shell, and the light guide columns are accommodated in the transparent grooves and can be slidably moved therein.

10. The key structure for the keyboard according to claim 1, wherein the key structure further comprises a cap, and the cap is assembled on the top of the pressing shaft and follows the pressing shaft to rise or fall.

* * * * *